United States Patent
Park et al.

(10) Patent No.: US 7,577,454 B2
(45) Date of Patent: Aug. 18, 2009

(54) METHOD AND SYSTEM FOR COLLECTING OPINIONS OF PUSH-TO-TALK OVER CELLULAR PARTICIPANTS IN PUSH-TO-TALK OVER CELLULAR NETWORK

(75) Inventors: Sung-Jin Park, Suwon-si (KR); Joon-Goo Park, Yongin-si (KR); Sang-Kyung Sung, Suwon-si (KR); Bo-Sun Jung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 576 days.

(21) Appl. No.: 11/386,491

(22) Filed: Mar. 22, 2006

(65) Prior Publication Data
US 2006/0234745 A1 Oct. 19, 2006

(30) Foreign Application Priority Data
Mar. 22, 2005 (KR) ............... 10-2005-0023802

(51) Int. Cl.
*H04W 84/08* (2006.01)
(52) U.S. Cl. .......................... 455/518
(58) Field of Classification Search .......... None
See application file for complete search history.

(56) References Cited

U.S. PATENT DOCUMENTS

2002/0168992 A1* 11/2002 Eiden et al. ............ 455/518
2005/0105511 A1 5/2005 Poikselka ............. 370/352
2005/0215273 A1 9/2005 Ito ..................... 455/518

OTHER PUBLICATIONS

Raktale, 3PoC: An Architecture for Enabling Push to Talk Services in 3GPP Networks, 2005 IEEE International Conference on Personal Wireless Communications, Jan. 23-25, 2005, pp. 202-206.
Kim et al., IMS-Based Push-to-Talk Over GPRS/UMTS, Wireless Communications and Networking Conference, Mar. 13-17, 2005; pp. 2472-2477.

* cited by examiner

*Primary Examiner*—Philip J Sobutka
(74) *Attorney, Agent, or Firm*—The Farrell Law Firm, LLP (57) ABSTRACT

A method and system collect opinions of PoC clients in a PoC network, and provide a PoC system with an opinion voting function capable of collecting the opinions and performing an opinion voting procedure regardless of whether a floor is used when a user collects the opinion. The method includes transmitting a message including a request to use a voting function and content to be voted from an arbitrary user in a group to a session management server, determining whether the voting function is occupied by another user in the group, transmitting the content to be voted to the other users in the group when the voting function is not occupied by another user, and transmitting a response of the content to be voted.

29 Claims, 10 Drawing Sheets

| V = 2 | P | SUBTYPE | PT = APP = 204 | LENGTH |
|---|---|---|---|---|
| SSRC/CSRC ||||
| NAME (ASC II) ||||
| APPLICATION – DEPENDENT DATA ⋯ ||||

FIG. 7B

| V = 2 | P | 10001 | PT = APP = 204 | length = 2 |
|---|---|---|---|---|

| SSRC of PoC Client requesting Voting Function | Name = PoC vote |
|---|---|

```
<? xml version="1.0" encoding="UTF-8" ?>
<PoC_vote xmlns="www.samsung.com"
 xmlns:xsi="http://www.w3.org/2001/XMLSchema-instance"
 xsi:SchemaLocation="www.samsung.com vote_service.xsd">

<voting id="39625">
 <Initiator> JOHN DOE </Initiator>
 <StartTime> 2005-03-15T 16:55:05 </StartTime>
 <Voting_reason> Vote for Dinner Menu Decision </Voting_reason>
 <Item>
  <First> 1. Beef-ribs </First>
  <Second> 2. Fatback </Second>
  <Third> 3. Marine products soup </Third>
  <Fourth> 4. Lobster </Fourth>
 </Item>
</voting>
<voting id="39626">
 .......
</voting>
</PoC_vote>
```

FIG. 8

```xml
<? xml version="1.0" encoding="UTF-8" ?>
<xs:schema
    targetNamespace="www.samsung.com"
    xmlns:xs="http://www.w3.org/2001/XMLSchema"
    elementFormDefault="qualified" attributeFormDefault="unqualified">

<!-- The root "PoC_vote" element -->
<xs:element name="PoC_vote">
    <xs:complextype>
        <xs:element name="voting" minOccurs="1" maxOccurs="unbounded">
            <xs:complextype>
                <xs:sequence>
                    <xs:element name="Initiator" type="xs:string" />
                    <xs:element name="StartTime" type="xs:dateTime" />
                    <xs:element name="Voting_reason" type="xs:string" />
                    <xs:element name="Item">
                        <xs:complextype>
                            <xs:sequence>
                                <xs:element name="First" type="xs:string" />
                                <xs:element name="Second" type="xs:string" />
                                <xs:element name="Third" type="xs:string" minOccurs="0" />
                                <xs:element name="Fourth" type="xs:string" minOccurs="0" />
                            </xs:sequence>
                        </xs:complextype>
                    </xs:element>
                </xs:sequence>
                <xs:attribute name="id" type="xs:ID" use="required" />
            </xs:complextype>
        </xs:element>
    </xs:complextype>
</xs:element>
</xs:schema>
```

METHOD AND SYSTEM FOR COLLECTING OPINIONS OF PUSH-TO-TALK OVER CELLULAR PARTICIPANTS IN PUSH-TO-TALK OVER CELLULAR NETWORK

CLAIM OF PRIORITY

This application claims the benefit under 35 U.S.C. §119(a) from an application entitled "METHOD AND SYSTEM FOR COLLECTING OPINIONS OF PUSH-TO-TALK OVER CELLULAR PARTICIPANTS IN PUSH-TO-TALK OVER CELLULAR NETWORK" filed in the Korean Intellectual Property Office on Mar. 22, 2005 and assigned Serial No. 2005-23802, the contents of which are incorporated herein by reference.

BACKGROUND OF THE INVENTION

1. Field of the Invention

The present invention relates to a method for collecting opinions of push-to-talk-cellular (PoC) participants in a PoC network.

2. Description of the Related Art

Significant developments in mobile communications technology and the extension of mobile communications networks have resulted in the development of a vast array of services and applications for use with a cellular phone. At the same time, demand among cellular phone users for these additional services, such as a location, multimedia and a push-to-talk (PTT) service, is increasing. The PTT service supports various supplementary functions such as an instant messenger function and a status display function, as well as a group call and a voice call which are also provided by an existing radio or a trunk radio system (TRS).

Currently, standardization of a push-to-talk-over-cellular (PoC) service that employs the PTT function in a mobile communication network is taking place. A unique feature of the PoC service is that a user can participate in a plurality of PoC sessions and can also use a call service while switching from the PoC sessions as desired. This feature is a requirement that is specified in the open mobile alliance (OMA), which is a forum for specifying mobile communications services.

Figure 1:
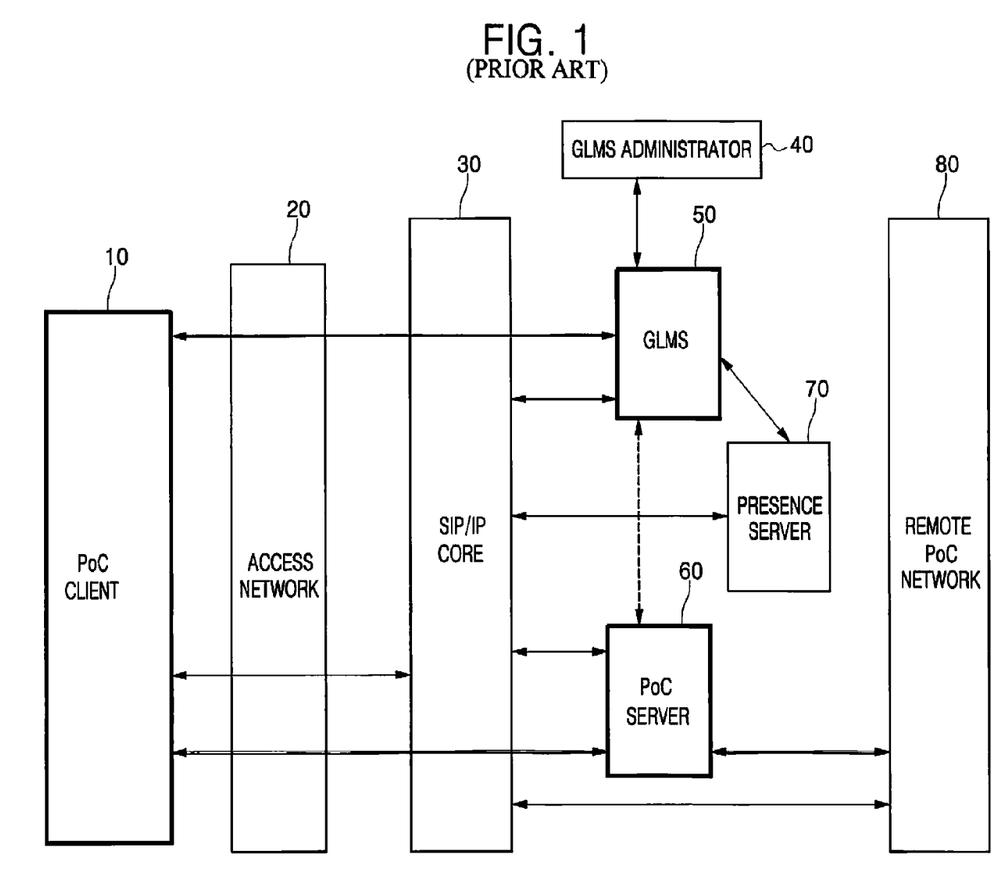
FIG. 1 is a schematic diagram of a conventional PoC service system.

FIG. 1 is a schematic diagram of a conventional PoC service system. Referring to FIG. 1, a PoC client 10, as a service requester installed in a mobile station, is generally connected to a Session Initiation Protocol/Internet Protocol (SIP/IP) core 30 that supports SIP and IP multimedia via an access network 20.

The PoC client 10 resides in a PoC user terminal to provide access to the PoC service. The PoC client 10 mainly serves to establish, participate in and terminate a PoC session. In addition, the PoC client 10 makes and transfers a talk burst, supports an instant personal alert and performs authentication when accessing the PoC service. Hereinafter, unless otherwise stated, the PoC client 10 and PoC user are assumed to be the same as a PoC service subscriber.

The SIP/IP core 30 is connected to a PoC server 60, a Group List and Management System (GLMS) 50 and a presence server 70 in order to support the PoC service.

The PoC server 60 has a Controlling PoC Function for maintaining and managing a PoC session, or a Participating PoC Function for participating in a PoC session for a one-to-one PoC call or a one-to-two or more PoC call (or group PoC call).

Figure 2:
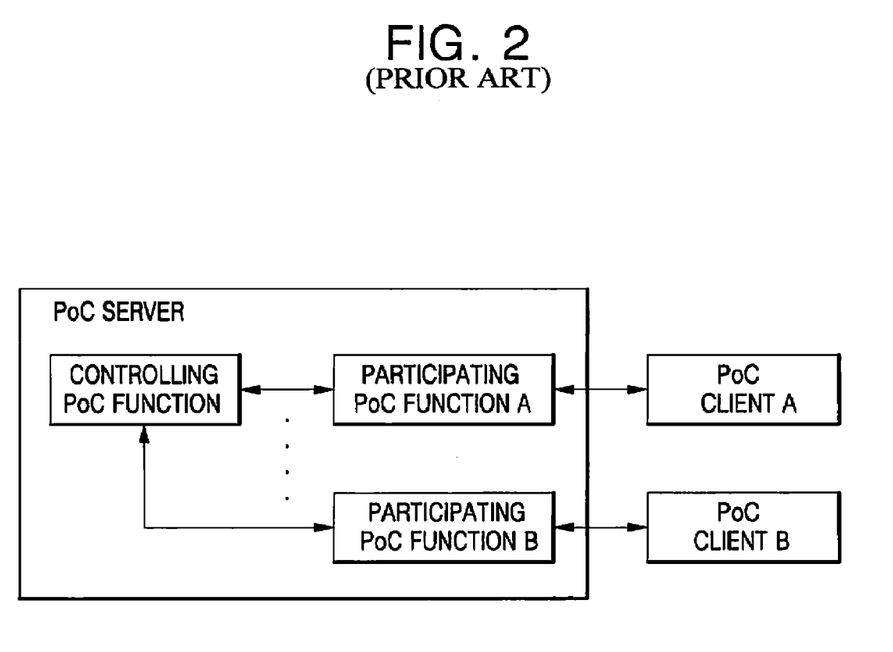
FIG. 2 shows a schematic configuration of a conventional PoC server.

Functional blocks in the PoC server will be described with reference to FIG. 2, a schematic diagram showing the configuration of a conventional PoC server.

The PoC server performs both a Controlling PoC Function (hereinafter "CF") of controlling overall maintenance and management of a PoC session and the Participating PoC Function (hereinafter "PF") of controlling maintenance and management between each PoC session, which will be explained below with reference to Tables 1 and 2.

TABLE 1

Controlling PoC Function (CF)

Provides centralized PoC session handling
Provides centralized Media distribution
Provides centralized Talk Burst Arbitration functionality
including talker identification
Provides SIP session handling, such as SIP session origination,
termination, etc.
Provides policy enforcement for participation in group sessions
Provides participant information
Collects and provides centralized media quality information
Provides centralized charging reports
May provide transcoding between different codecs
Supports Talk Burst Control Protocol Negotiation As shown in Table 1, the PoC server performing the CF (or the Controlling PoC server) serves to manage a PoC session. In particular, the Controlling PoC server receives requests for the floor from PoC clients, arranges an order in which to give the clients the floor, and gives the clients the floor in that order. The Controlling PoC server also distributes a talk burst, for which an arbitrary PoC client makes a request, to all other PoC clients participating in a group PoC call, and provides information of the PoC clients participating in the group PoC call.

As shown in Table 2 below, the PoC server performing the PF (or the Participating PoC server) manages a PoC session between the Controlling PoC server and each PoC client. In particular, the Participating PoC server acts to relay the floor between the PoC client and the Controlling PoC server when the PoC client makes a request for the floor or when the Controlling PoC server gives the floor to the PoC client. In addition, the Participating PoC server relays media between the Controlling PoC server and the PoC client, performs transcoding between different codecs, and filters one of two concurrent PoC sessions according to the choice of a PoC user when there is simultaneous talking in the two active PoC sessions.

TABLE 2

Participating PoC Function (PF)

Provides PoC session handling
May provide the Media relay function between PoC client and
Controlling PoC server
May provide user media adaptation procedures
May provide the Talk Burst control message relay function between
PoC client and Controlling PoC server
Provides SIP session handling, such as SIP session origination,
termination, etc, on behalf of the represented PoC client.
Provides policy enforcement for incoming PoC session (e.g. access
control, incoming PoC session barring, availability status, etc.)
May collect and provide media quality information
Provides participant charging reports
May provide filtering of media streams in the case of
simultaneous sessions
May provide transcoding between different codecs
May support Talk Burst Control Protocol Negotiation
Stores the current Answer Mode and Incoming PoC Session Barring
preferences of the PoC client In the PoC service system described above, the PoC user can input information on groups and their members into the GLMS 50 through the PoC user's terminal, and can receive information about other PoC users with whom the PoC user can talk through an individual or group list transmitted from the GLMS 50. Alternatively, in order to create, modify and manage groups and their members, the information on the groups and their members may be input into the GLMS 50 via a communication network, such as an Internet or Intranet.

In order to use the PoC call service, the PoC user registers his/her PoC address with the SIP/IP core 30. The SIP/IP core 30 stores information on the PoC user by request of the PoC user. Thus, when another PoC user tries to request the group PoC call, the PoC user registers his/her information with the SIP/IP core 30 in advance, and requests the group PoC call to his/her SIP/IP core 30 by using group identification information transmitted from the GLMS 50. At this time, the SIP/IP core 30 performs addressing and domain locating by using information of the requesting PoC user and then transfers a PoC call request to a home PoC server with which the requesting PoC user is registered. In regard to the PoC call request, the PoC server prepares to establish a PoC session, obtains each user's information from the GLMS 50, and then transfers a PoC call request signal to the SIP/IP core. When a PoC call request is made to users within an Intradomain, the PoC server performs both the CF and the PF. The PoC server managing the call-requested PoC user requests the PoC call to the PoC user after locating the SIP/IP core 30 by using the PoC user's information transmitted to the PoC server.

Figure 3:
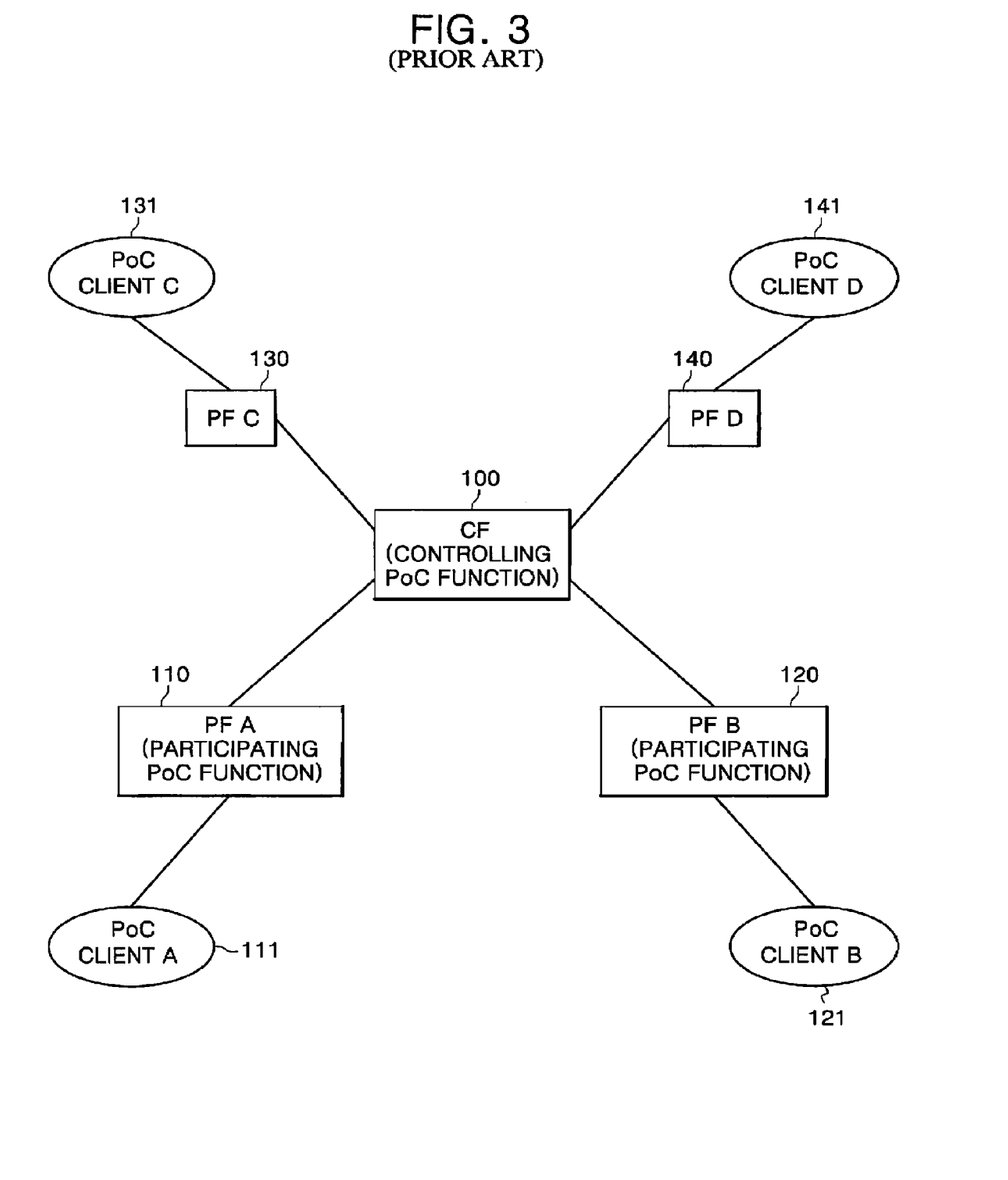
FIG. 3 is a schematic diagram illustrating CF and PF blocks of a conventional PoC server.

FIG. 3 is a schematic diagram illustrating CF and PF blocks of a PoC server. Referring to FIG. 3, PoC clients 111, 121, 131 and 141 provide access to a CF 100 through PFs 110, 120, 130 and 140 respectively, thereby establishing a PoC session. Here, when a floor is granted to a requester qualified as a talker from the CF 100, media based on speaking of the corresponding PoC client is transmitted to each PoC client.

Figure 4:
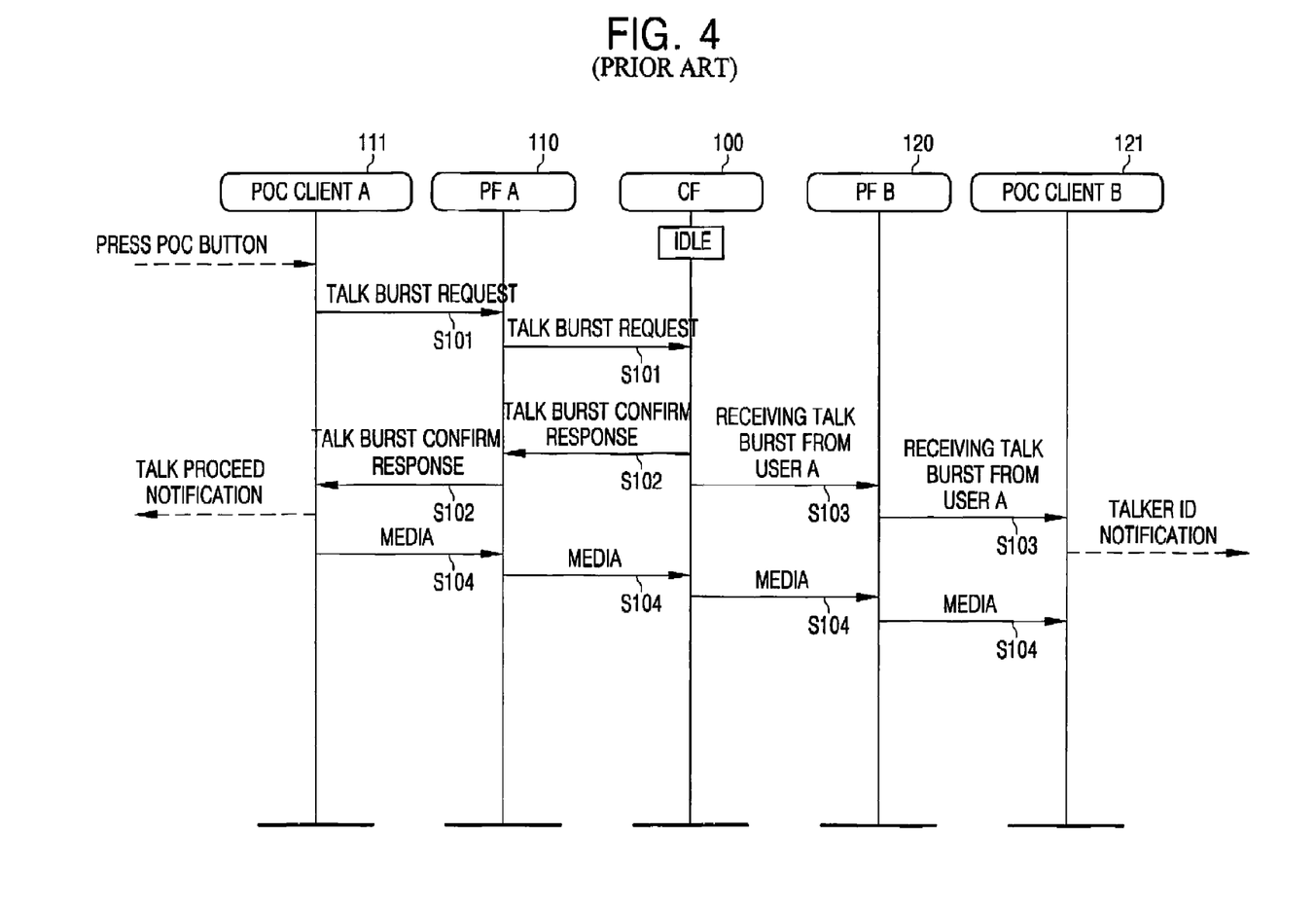
FIG. 4 is a signaling flow for a conventional procedure in which a PoC user obtains a floor.

FIG. 4 is a signaling flow for a conventional procedure where a PoC user obtains a floor.

Referring to FIG. 4, in order to obtain a floor, a PoC client A 111 presses a PoC talk button installed to his/her own PoC terminal when no PoC client is talking within a PoC session where the PoC client A 111 is connected to a PoC client B 121.

Therefore, the PoC client A 111 transmits a Talk Burst Request message (S101) requesting the floor, to a PF A 110 acting as the Participating PoC Function. Thus, the PF A 110 transmits the Talk Burst Request message (S101) to a CF 100, a Controlling PoC server, acting as Controlling PoC Function of this PoC session.

After receiving the Talk Burst Request message (S101), the CF 100 transmits a Talk Burst Confirm Response message (S102) notifying that the floor is granted, to the PoC client A 111 as well as a Receiving Talk Burst from User A message (S103) to the PoC client B 121. Since the latter message includes an identifier (ID) of the PoC client A 111 who is qualified as the talker, the PoC client B 121 knows identity of the talker.

Then, a media session is opened, and a talk burst media (S104) is transmitted from the PoC client A 111 to the PoC client B 121.

However, the foregoing conventional art considers opinions of all persons requesting the floor when an attempt is made to hear and collect all of the opinions in the group PoC call. Hence, all procedures associated with such instances as a time to grant the floor and a time to propose the opinion when the floor is granted, are performed as many times as the number of group members. As such, the procedure is complicated and too much time is expended.

SUMMARY OF THE INVENTION

It is an object of the present invention to provide a method and system for collecting opinions of PoC clients in a PoC network, capable of providing a PoC system with an opinion voting function capable of collecting the opinions and performing an opinion voting procedure regardless of whether a floor is used when a user collects the opinion.

According to the present invention, there is provided a method for collecting opinions of push-to-talk-over-cellular (PoC) participants in a PoC network, including transmitting a message including a request to use a voting function and content to be voted from an arbitrary user to a session management server, determining, by the session management server, whether the voting function is occupied by another user, transmitting, by the session management server, the content to be voted to the other users belonging to a group when it is determined that the voting function is not occupied by another user, and transmitting, by the other group users, a response of the content to be voted.

According to the present invention, there is provided a method for collecting opinions of push-to-talk-over-cellular (PoC) clients in a PoC network, including requesting, by an arbitrary user, a session management server to use a voting function, determining, by the session management server, whether or not the voting function is occupied by another user, informing, by the session management server, the user requesting the use of the voting function that the voting function can be used at present when it is determined that the voting function is not occupied by another user, transmitting, by the user receiving a voting function available signal, the content to be voted to the session management server, transmitting, by the session management server, the content to be voted to the other users belonging to a group, and transmitting, by the other group users, a response of the content to be voted.

According to the present invention, there is provided a system for collecting opinions of push-to-talk-over-cellular (PoC) clients in a PoC network, including an arbitrary client for making a request to use a voting function, at least one client for participating in the voting function requested by the arbitrary client, and a session management server for determining, when the request to use the voting function is transmitted from the arbitrary client, whether the voting function is occupied by another user, and transmitting the content (i.e., voting issue, question, and options) to be voted to the other users belonging to a group when it is determined that the voting function is not occupied by another user.

BRIEF DESCRIPTION OF THE DRAWINGS

The above and other objects, features and advantages of the present invention will be more clearly understood from the following detailed description, taken in conjunction with the accompanying drawings, in which.

DETAILED DESCRIPTION OF EXEMPLARY EMBODIMENTS

Hereinafter, exemplary embodiments of the present invention will be described in full detail with reference to the accompanying drawings. In the following description, a detailed description of known functions and configurations incorporated herein has been omitted for the sake of clarity and conciseness.

Figure 5A:
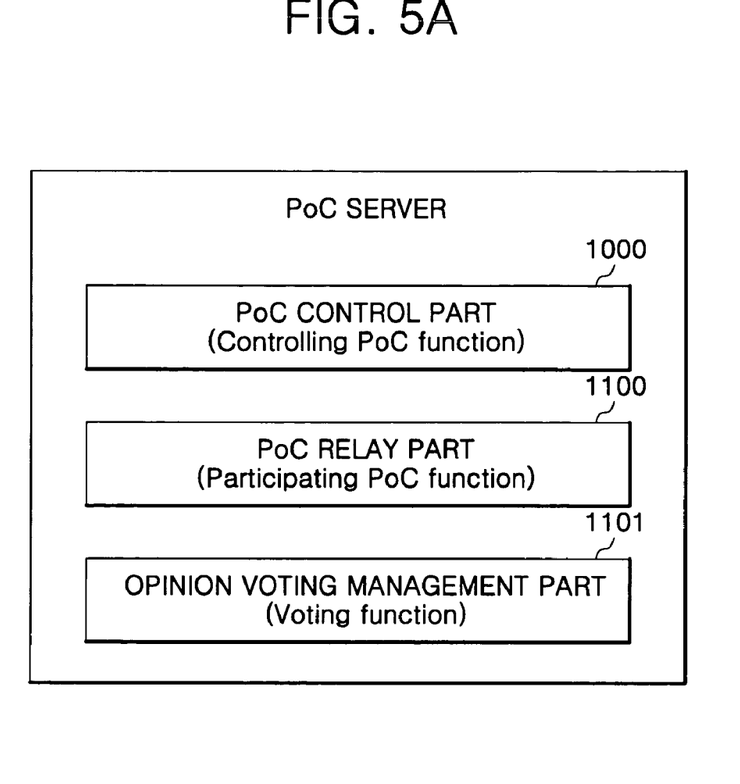
FIG. 5A is a block diagram of a PoC server for implementing the present invention.
Figure 5B:
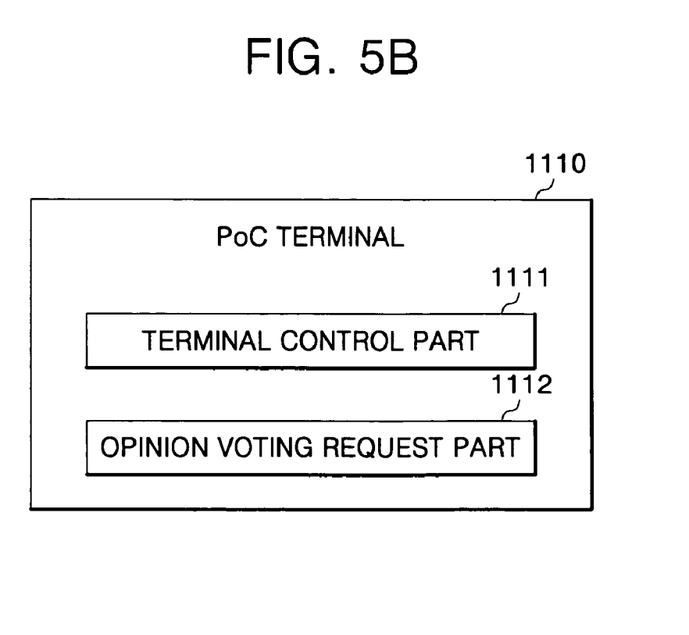
FIG. 5B is a block diagram of a PoC terminal for implementing the present invention.

FIG. 5A is a block diagram of a PoC server for implementing the present invention, and FIG. 5B is a block diagram of a PoC terminal for implementing the present invention.

First, since a PoC client should be capable of selecting an opinion voting function (i.e. an opinion collecting function), a PoC terminal 1110 that the PoC client uses includes a terminal control part 1111 for controlling an overall function thereof and an opinion voting request part 1112 for requesting to a session management server to collect opinions when the opinion voting function is selected, as shown in FIG. 5B.

When intending to collect the opinions on a certain theme from other users who are participating in the same session, the PoC client can request to the session management server to collect the opinions through the opinion voting request part 1112.

Further, in order to collect the opinions by request of the opinion voting function from the PoC terminal 1110, a PoC server includes a PoC control part 1000 for controlling an overall control of thereof, a PoC relay part 1100 for managing the sessions connected with each PoC client to relay the sessions, and an opinion voting management part 1101 for authorizing the use of the opinion voting when receiving a request signal for using the opinion voting function from an arbitrary PoC terminal and determining whether the opinion voting function is occupied by another user, as shown in FIG. 5A.

The opinion voting management part 1101 activates the opinion voting function of the PoC users, informs the PoC user of options of the activated opinion voting function, and collects a result from the PoC user when the PoC user sees the options to determine his/her desired options.

In a state where the foregoing construction is prepared, in order to use the opinion voting function, the PoC client requests use of the opinion voting function to the PoC server. To transmit this request, the present invention uses a Real-time Transport Protocol (RTP) Control Protocol (RTCP) APP as a Talk Burst Control Protocol (TBCP).

The TBCP based on the RTCP APP packet is used in the PoC system defined in Open Mobile Alliance (OMA). The TBCP serves to carry messages, for instance, when requesting, granting or rejecting a floor. Further, the TBCP serves to control an application delivering information using the RTP.

An opinion voting request message using the RTCP APP will be described below with reference to FIGS. 7A and 7B.

The PoC server fundamentally provides a controlling PoC function, a participating PoC function and a voting function.

The controlling and participating PoC functions have been previously described in conjunction with the conventional art. Thus, their description will be omitted.

The opinion voting management part 1101, controlling the opinion voting function in the PoC server, can respond to the activation of the opinion voting function that is received from a PoC client. For example, the opinion voting management part 1101 transmits contents notifying that the opinion voting function cannot be used due to the current use of another PoC participant through a response procedure.

The opinion voting management part 1101 should be capable of activating the opinion voting function with respect to a corresponding PoC group. In other words, the opinion voting management part 1101 notifies all the participants, i.e. all the PoC users, that it will activate the opinion voting function of its PoC server so as to use the opinion voting function in the corresponding PoC group. Further, the opinion voting management part 1101 should collect, estimate and combine the results selected by the PoC users, and notify all the PoC users participating in the PoC group of the final result.

Figure 6A:
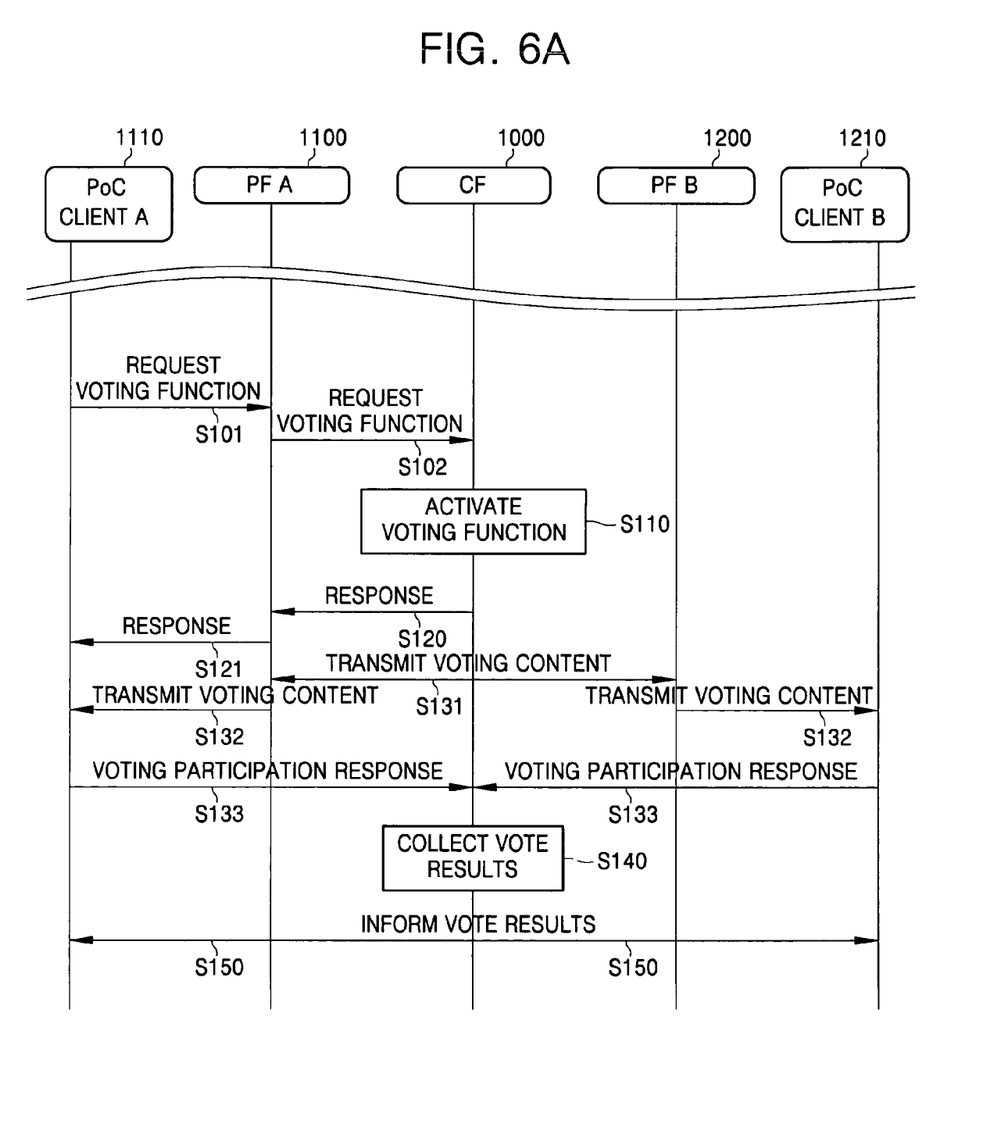
FIG. 6A is a signaling flow for the process of collecting an opinion from a PoC client in accordance with the present invention.

FIG. 6A is a signaling flow for a process of collecting an opinion from a PoC client in accordance with the present invention.

First, when an arbitrary participant (e.g. a PoC client A of FIG. 6A) is required to collect entire opinions on one theme during a group talk, the participant requests an opinion voting function from PoC servers (PF A and CF) 1100 and 1000 (S101 and S102).

The CF 1000 receiving the opinion voting function request checks whether an existing opinion voting function is in progress. In FIG. 6A, the existing opinion voting function is not in progress.

Thus, the CF 1000 activates the opinion voting function to carry out the requested opinion voting function (S110), prepares an response message notifying that opinion voting can be performed, and transmits the response message to the PoC user (PoC Client A) requesting the opinion voting function (S120 and S121).

On the other hand, when the existing opinion voting function is in progress, the CF 1000 prepares a request denial or failure message, which will be described with reference to FIG. 6B.

Then, a message for requesting the opinion voting function is transmitted to all the participants in the group (S131 and S132).

At this time, the transmitted message for the opinion voting function contains information on the PoC client requesting the opinion voting function, a theme of the opinion voting, and other related information.

In the present invention, a protocol used to request the opinion voting function is based on an RTCP Application Packet (RTCP: APP), on an application-dependent data of which information associated with the opinion voting is carried and transmitted using an Extensible Mark-up Language (XML). Here, before the XML is used, an XML schema document defining the PoC opinion voting should be prepared. This XML schema is different in content according to each Document Instance. For example, the XML schema defining the opinion voting function defines various contents, such as an initiator, a voting start time and a voting reason, as first, second, third, fourth, and so on. Then, the contents defined in the XML schema are recorded into the application-dependent data field of an RTCP: APP message format, and transmitted to the PoC client.

In this manner, the opinion voting function can be requested by using the RTCP: APP, but it may be requested by using an existing floor in a simpler manner. In the latter case, the PoC user obtains the floor and presents the theme for the opinion voting and numbers for selecting the theme through voice.

Specifically, when the PoC user selects an arbitrary theme through an input unit, the selection should be sent so as to enable the opinion voting management part 1101 of the PoC server to read the selected number.

When each participant of the group receives the opinion voting request and thus the message using the XML in the application-dependent data field, a validation procedure is performed on whether the XML is used as defined in the XML schema. To this end, the PoC client provides access to an XML server having the XML schema. If it is determined that the XML is correctly used, information using the XML for the opinion voting function in the PoC client is displayed using a language, such as Extensible Stylesheet Language Transformations (XSLT) or HyperText Markup Language (HTML), capable of expressing the XML. The PoC user selects his/her own decision, for instance, using a keypad, and then re-transmits the selection to the PoC server (S133). For example, the PoC user selects one of Opinion 1, Opinion 2, Opinion 3 and Opinion 4, and then transmits the selection to the PoC server through the RTCP: APP.

The CF 1000 collects the decisions sent from each participant (S140), and draws a conclusion according to each content. In the collecting process, the number of participants that push down Opinion 1, Opinion 2, Opinion 3 and Opinion 4 is calculated and expressed as a percentage or a statistical index as needed.

Next, all PoC users who participate in the group (S150) are informed of the vote results.

It is noted that only the opinion voting function may be initiated by transmitting an RTCP: APP message with no information recorded into the application-dependent data field.

In this case, a request to activate the opinion voting function may be first received on the side of the PoC server, and then a theme of the opinion voting and its relevant information may be separately received.

Figure 6B:
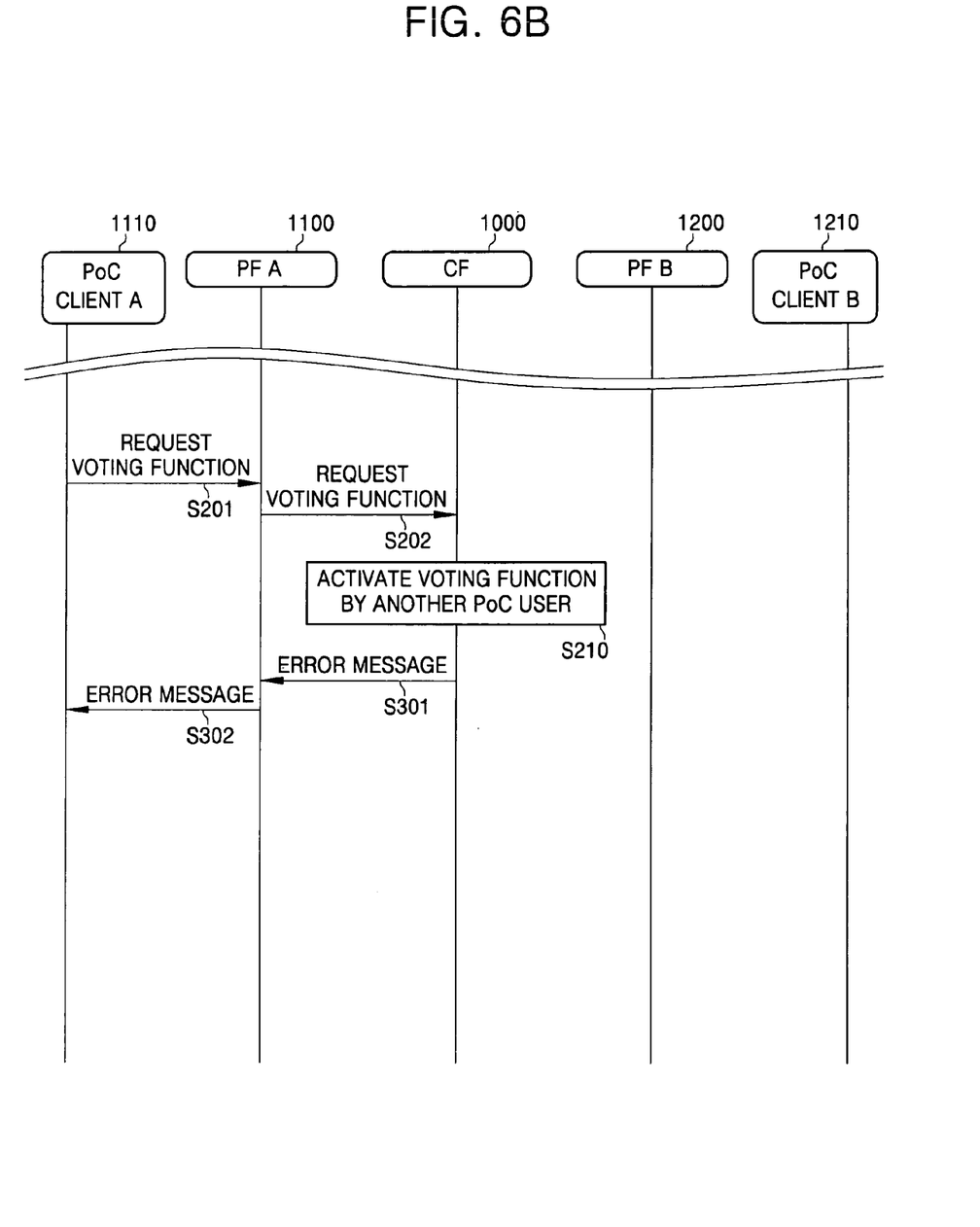
FIG. 6B is a signaling flow when an opinion voting function is pre-occupied by another PoC user.

FIG. 6B is a signaling flow when an opinion voting function is pre-occupied by another PoC user.

First, an arbitrary participant (e.g. a PoC client A) is required to collect entire opinions on one theme during a group talk, and the participant requests an opinion voting function from PoC servers (PF A and CF) 1100 and 1000 (S201 and S202).

The CF 1000 receiving the opinion voting function request checks whether an existing opinion voting function is in progress. When it is determined that the existing opinion voting function is in progress (S210), the CF 1000 transmits an error message (S301 and S302) informing that the opinion voting function has been already occupied by another PoC user to the PoC client A 1110 requesting the opinion voting function.

Figure 7A:
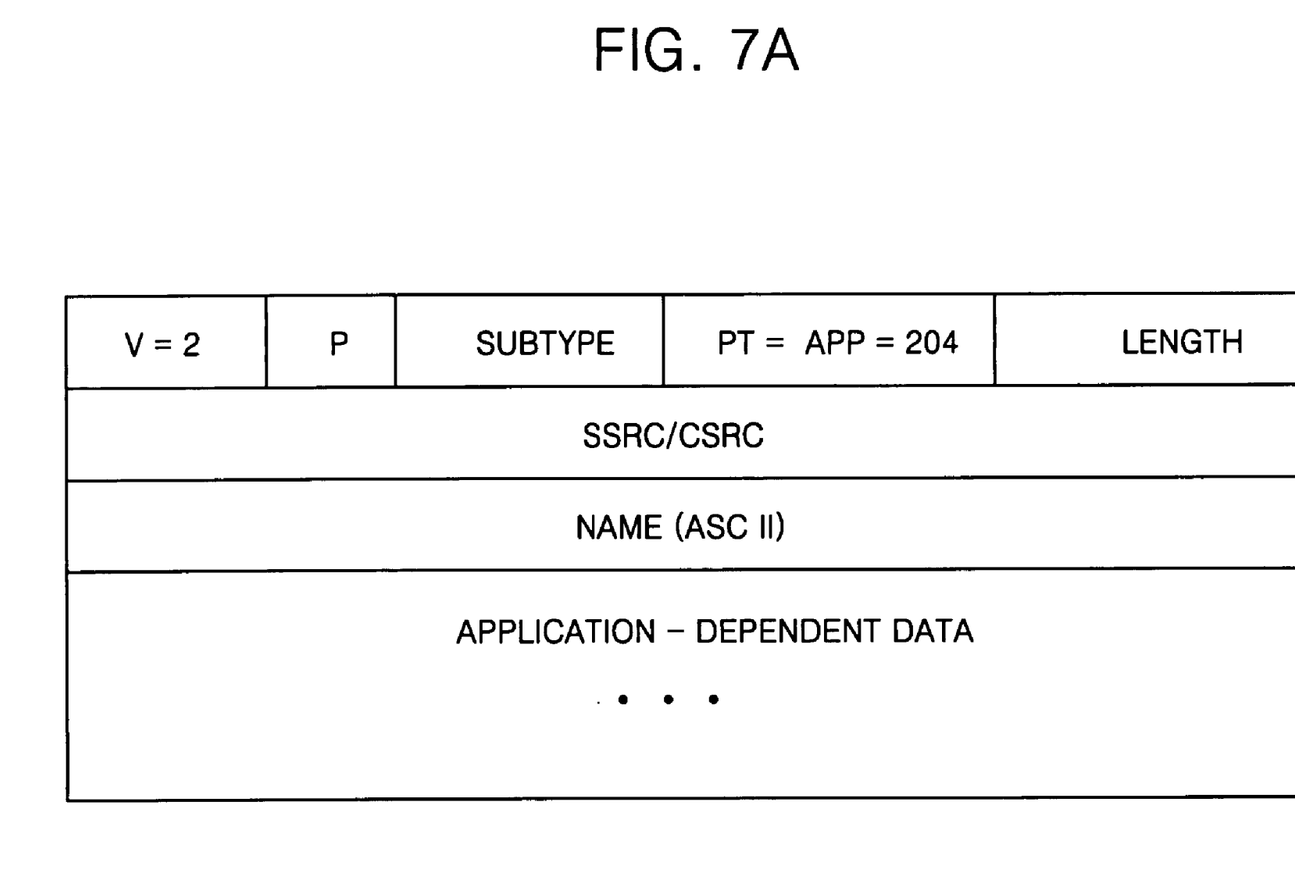
FIG. 7A shows the format of a Real-time Transport Protocol (RTP) Control Protocol (RTCP APP) packet for implementing the present invention.
Figure 7B:
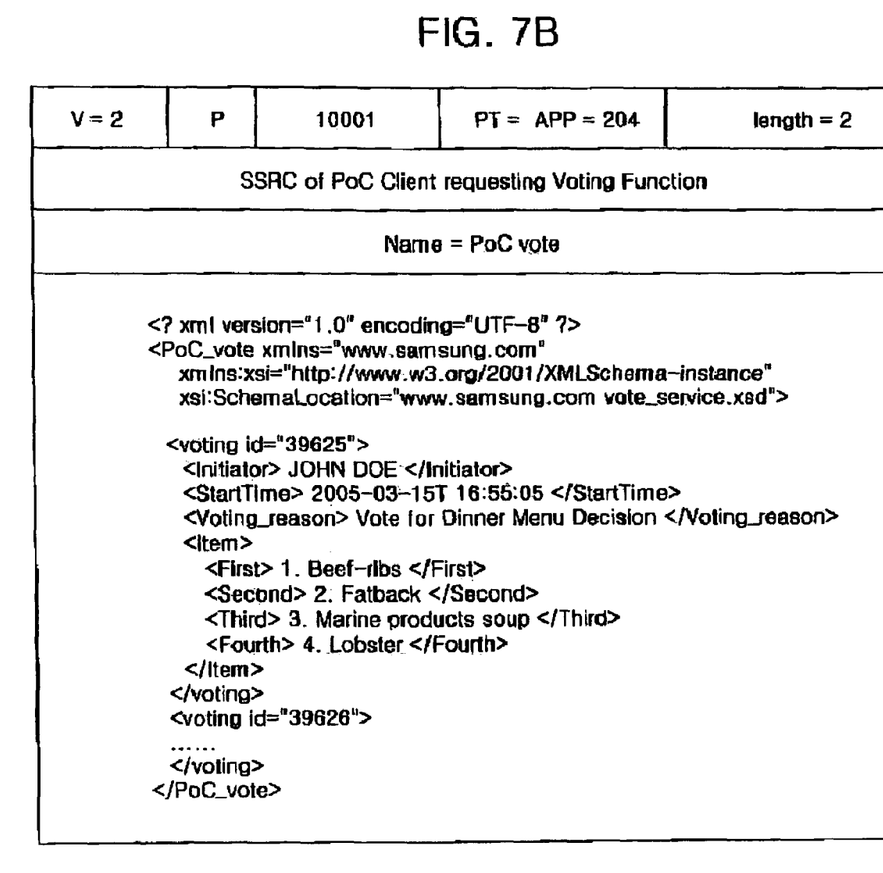
FIG. 7B shows a message format when an opinion voting function is requested.

FIG. 7A shows the format of an RTCP APP packet for implementing the present invention, and FIG. 7B shows fields of an opinion voting message of FIG. 7A.

Referring to FIGS. 7A and 7B (see RFC 3550 defined by Internet Engineering Task Force (IETF)), an RTCP APP packet indicates an RTP version in a first 2-bit field (version=2 in the present invention).

The next bit field is a padding bit field. It can be seen that when a padding bit is given, one or two padding octets that do not belong to a payload are added.

A third 5-bit field indicates a subtype (see the OMA PoC User Plane specification). The subtype is allowed to know which TBCP role is performed by the RTCP APP packet.

For example, in the current specification prepared by the OMA, a value of the subtype is defined as 00000 for a TBCP Talk Burst Request message, and 00001 for a TBCP Talk Burst Granted message. Because 16 TBCP messages are defined up to now, the subtype values are defined up to 01111. The remaining 16 TBCP messages are reserved for the TBCP talk burst control message to be newly created.

Therefore, in the present invention, any one of the subtype values from 10000 to 11111 is selected, so that it can be discriminated from the other values for the TBCP talk burst control message. Further, the remaining subtype value, 10001, is used and discriminated form the other values for the TBCP talk burst control message.

However, when a content of the message indicates a function of requesting the opinion voting regardless of which of the remaining values the subtype has, it is considered as the same TBCP talk burst control message.

A fourth 1-byte field has a value, 204, as a packet type, which indicates that the message is the RTCP APP packet.

A fifth 2-byte field is a length field, indicating a length of the message. When a number, 2, is used in this field, this indicates that the message has two 4-byte octets. Followed by the payload, this indicates the number of 4-byte octets that exists in this field.

A sixth 4-byte field is a synchronization source field (synchronization source (SSRC), contributing source (CSRC)). This field identifies who requests the opinion voting, including a synchronization source associated with the transmitter of the RTCP APP message.

A seventh 4-byte field is a name field expressed in the American Standard Code for Information Interchange (ASCII), indicating that the message is used for a PoC vote.

An eighth field is an application-dependent data field, into which information required to operate an application is recorded. In particular, the information includes one set of information prepared in a form of the opinion voting function using the XML. The opinion voting function of the PoC client or server is exerted on the basis of the information of the application-dependent data field.

An example of requesting the PoC vote using one XML is prepared in the application-dependent data field. First, a first item is a declaration using an XML of version 1.0 and UTF-8 encoding. A second item is a declaration using a PoC_vote and including a content of using www.samsung.com as a namespace and a content using vote_service.xsd of www.samsung.com as an XML schema. A third item, voting id="39625", indicates that a voting is used and that id has a value of 39625. The value of 39625 is allowed to discriminate the voting from that of another theme. The sub-items are depicted by sorting information included in the voting according to each item. For example, a person requesting the voting is named John Doe. A voting start time is 16:55:05 on Mar. 15th, 2005. A theme of the voting is a "vote for dinner menu decision," the sub-items of which are as follows: 1. Beef-ribs, 2. Fatback, 3. Marine products soup, and 4. Lobster. The item, voting id="39626", below indicates that a voting different from the voting above is used. In this case, the voting can be used two or more times when being requested once. While being described again in conjunction with a vote_service.xsd XML schema of FIG. 8, the voting can be made as many times as designated in the XML schema. In this example, due to minOccurs="1" and maxOccurs="unbounded", when being requested, the voting should be made at least once, and it can be made up to indefinite times according to a decision of the person who requests the voting.

Figure 8:
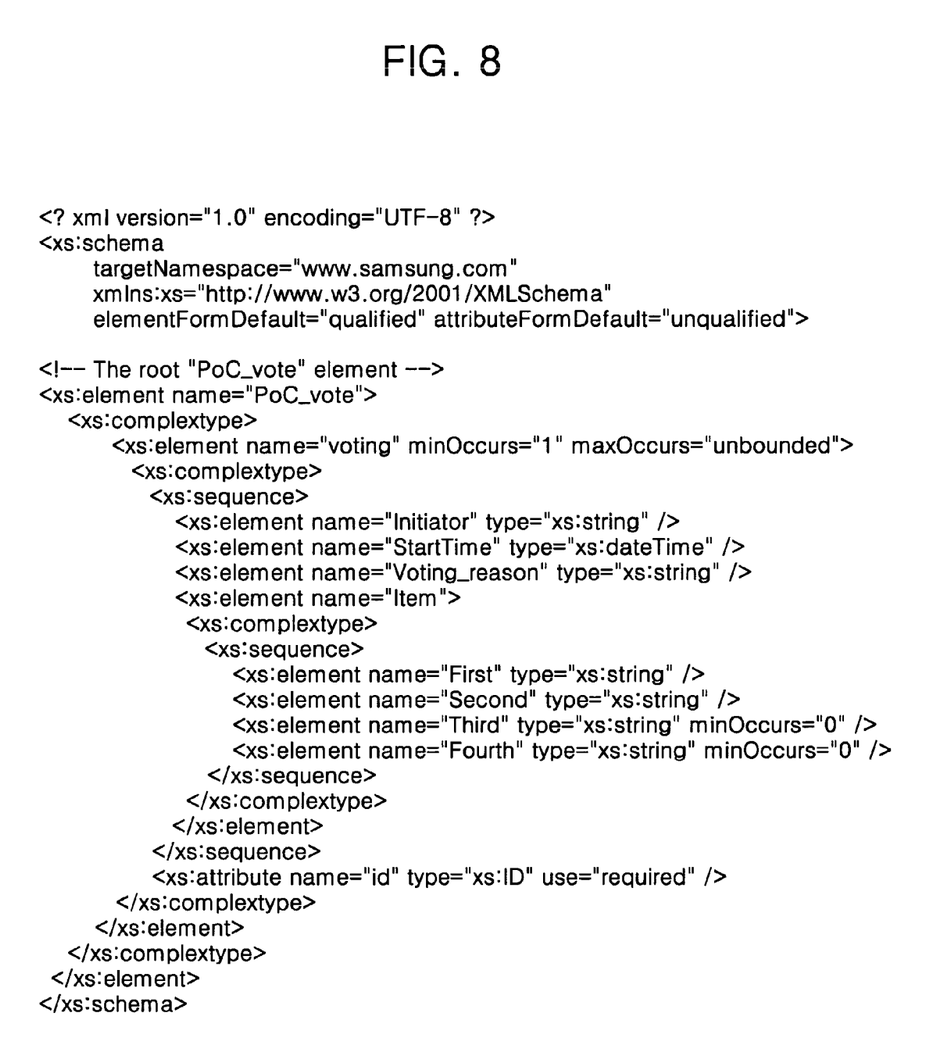
FIG. 8 shows an example of an XML schema for PoC voting.

FIG. 8 shows an example of an XML schema for PoC voting. Referring to FIG. 8, first, an XML schema is prepared for the XML document prepared in the application-dependent data field of FIG. 7B, as an example for the PoC voting.

A first item is a declaration using an XML of version 1.0 and UTF-8 encoding. A second item indicates that, after the XML schema is prepared, the schema is defined in www.samsung.com, complies with a form of www.w3.org/2001/XMLschema, uses an element form as defined in the schema through validation, and that there is no qualified form in terms of attribute items. The other items including a third item give a definition of each element. First, a PoC_vote element is defined, and a sub-element of the PoC_vote element is a voting element.

An attribute of the voting element should use a voting at least once and with no limitation at least twice as described with reference to FIG. 7B, and can be discriminated from other voting due to its ID. The meaning of use="required" is that id should be used. The voting element includes various elements, such as Initiator, StartTime, Voting_reason, and Item. The Item element has First, Second, Third and Fourth elements. The Third and Fourth elements may not be used. This is expressed by minOccurs="0". That is, the voting can be implemented in various manners, such as by multiple-choice.

In the present invention, the XML has been described to implement the RTCP APP by way of example. However, it is apparent to those skilled in the art that implementation by the text, HTML, or SIP protocol falls within the scope of the present invention.

According to the present invention as mentioned above, when the PoC user makes a decision while many persons participate in the group talk in which the PoC user participates, the opinion voting function is performed once regardless of the floor, so that the opinions can be collected from many persons at the same time.

Thus, the conventional procedure of requesting and granting the floor is omitted, so that the opinion collecting procedure is simplified, and the resulting time can be saved.

Further, the PoC server collects statistics of the opinion collecting results, to improve accuracy.

Although exemplary embodiments of the present invention have been described with reference to the attached drawings, the present invention is not limited to these embodiments, and it should be appreciated by those skilled in the art that a variety of modifications and changes can be made without departing from the spirit and scope of the present invention.

What is claimed is:

1. A method for collecting opinions of push-to-talk-over-cellular (PoC) participants in a PoC network, in which a PoC server is in communication with at least two PoC clients, the method comprising the steps of:

transmitting, by a PoC client, a message including a request to use a voting function and content to be voted to the PoC server;

determining, by the PoC server, whether or not the voting function is occupied by another PoC client different from the PoC client in the PoC network;

transmitting, by the PoC server, the content to be voted to other PoC clients different from the PoC client in the PoC network when it is determined that the voting function is not occupied by the another PoC client; and transmitting, by the other PoC clients, a response to the message including the content to be voted.

2. The method according to claim 1, further comprising, when it is determined that the voting function is occupied by the another PoC client, informing the PoC client requesting to use the voting function that the voting function is occupied by the another PoC client.

3. The method according to claim 1, further comprising, after the step of transmitting the response to the message including the content to be voted, informing, by the PoC server, the other PoC clients in the PoC network of vote results.

4. The method according to claim 3, further comprising, after the step of transmitting the response of the content to be voted, collecting, by the PoC server, statistics of the vote results.

5. The method according to claim 1, wherein the message including the request to use the voting function and the content to be voted uses a Talk Burst Control Protocol (TBCP) message of a Real-time Transport Control Protocol Application (RTCP APP) packet.

6. The method according to claim 5, wherein the TBCP message for providing the request to use the voting function and the content to be voted selects a reserved value of a subtype field of the RTCP APP packet.

7. The method according to claim 6, wherein the RTCP APP packet has a Synchronization Source (SSRC) field including a source of the user requesting the voting function in order to request use of the voting function.

8. The method according to claim 6, wherein the content to be voted is recorded in an application-dependent data field of the RTCP APP packet.

9. The method according to claim 6, wherein the content to be voted includes at least an initiator, a voting start time and a voting reason, each of which being indicated by a different whole number.

10. The PoC client method according to claim 9, wherein the requesting PoC client is at least one of a cellular phone and a mobile station.

11. The PoC client method according to claim 9, wherein the message including the request to use the voting function and the content to be voted includes a Talk Burst Control Protocol (TBCP) message of a Real-time Transport Control Protocol Application (RTCP APP) packet.

12. The PoC client method according to claim 11, wherein the RTCP APP packet includes a Synchronization Source (SSRC) field including a source of the user requesting the voting function in order to request the use of the voting function.

13. A push-to-talk-over-cellular(PoC) client method for collecting opinions of PoC clients in a PoC network, the method comprising the steps of:

generating a voting function for performing an opinion voting procedure and collecting content to be voted;

requesting, by a requesting PoC client, a use of the voting function from a session management server, receiving a voting function available signal from the session management server;

transmitting the content to be voted to the session management server for transmitting the content to other PoC clients different from the requesting PoC client; and collecting responses of the content to be voted from the other PoC clients.

14. The PoC client method according to claim 13, wherein the content to be voted is transmitted to the session management server in an Extensible Mark-up Language (XML).

15. The PoC client method according to claim 13, wherein the content to be voted includes at least an initiator, a voting start time and a voting reason, each of which being indicated by a different whole number.

16. A push-to-talk-over-cellular (PoC) server method for collecting opinions of PoC clients in a PoC network, the method comprising the steps of:
- receiving a voting function request from a requesting PoC client for requesting use of a voting function for performing an opinion voting procedure; determining whether or not the voting function is occupied by another PoC client different from the requesting PoC client;
- informing the requesting PoC client of a voting function available signal to be used when it is determined that the voting function is not occupied by the another PoC client;
- receiving a content to be voted from the requesting PoC client;
- transmitting the content to be voted to other PoC clients in communication with the PoC server in the PoC network; and
- collecting a response of the content to be voted from the other PoC clients.

17. The PoC server method according to claim 16, further comprising, when it is determined that the voting function is occupied by the another PoC client, informing the requesting PoC client that the voting function is occupied by the another PoC client.

18. The PoC server method according to claim 16, further comprising, after the step of transmitting the response of the content to be voted, informing, by the PoC server, the PoC clients in the PoC network of vote results.

19. The PoC server method according to claim 18, further comprising, after the step of transmitting the response of the content to be voted, collecting, byte PoC server, statistics of the vote results.

20. A push-to-talk-over-cellular (PoC) client method for collecting opinions of PoC clients in a PoC network, the PoC client method comprising:
- generating a voting function capable of performing an opinion voting procedure and collecting content to be voted;
- requesting use of the voting function to a session management server, receiving a voting function available signal from the session management server;
- transmitting the content to be voted to the session management server for transmitting the content to other PoC clients;
- collecting responses of the content voted by the other PoC clients.

21. The PoC client method according to claim 20, wherein the PoC Client includes at least one of a cellular phone and a mobile station.

22. The PoC client method according to claim 20, wherein the message including the request to use the voting function and the content to be voted includes a Talk Burst Control Protocol (TBCP) message of a Real-time Transport Control Protocol Application (RTCP APP) packet.

23. The PoC client method according to claim 22, wherein the RTCP APP packet includes a Synchronization Source (SSRC) field including a source of a user requesting the voting function.

24. The PoC client method according to claim 22, wherein the content to be voted in the is transmitted to the session management server in an Extensible Mark-up Language (XML).

25. The PoC client method according to claim 22, wherein the content to be voted includes at least an initiator, a voting start time, and a voting reason, each of which being indicated by a different whole number.

26. A push-to-talk-over-cellular (PoC) server for collecting opinions of PoC clients in a PoC network, the PoC server comprising:
- means for receiving a voting function request from a requesting PoC client for requesting use of a voting function for performing an opinion voting procedure;
- means for determining whether or not the voting function is occupied by another PoC client different from the requesting PoC client;
- means for informing the requesting PoC client of a voting function available signal to be used when it is determined that the voting function is not occupied by the another PoC client;
- means for receiving a content to be voted from the requesting PoC client;
- means for transmitting the content to be voted to other PoC clients in communication with the PoC server in the PoC network; and
- means for collecting a response of the content to be voted from the other PoC clients.

27. The PoC server according to claim 26, further comprising means for informing the requesting PoC client that the voting function is occupied by the another PoC clients, when it is determined that the voting function is occupied by another PoC clients.

28. The PoC server according to claim 26, further comprising means for informing, by the PoC server, the PoC clients in the PoC network of vote results.

29. The PoC server according to claim 28, further comprising means for collecting, by the PoC server, statistics of the vote results.

* * * * *

UNITED STATES PATENT AND TRADEMARK OFFICE
CERTIFICATE OF CORRECTION

PATENT NO. : 7,577,454 B2  Page 1 of 1
APPLICATION NO. : 11/386491
DATED : August 18, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this

Seventh Day of September, 2010

David J. Kappos
*Director of the United States Patent and Trademark Office*